Aug. 20, 1963   M. L. STINSON   3,101,192
TOOL FOR INSTALLING TROUGHING ROLLER ASSEMBLIES
Filed June 24, 1960   2 Sheets-Sheet 2
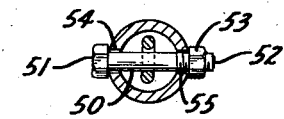
Fig. 4.
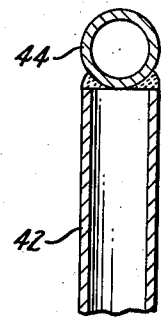
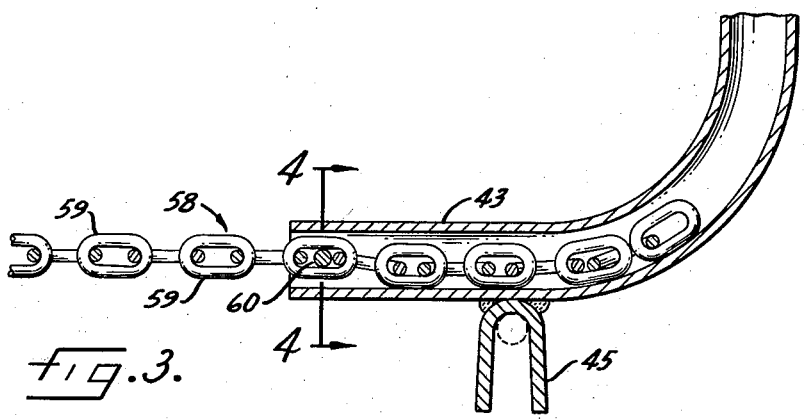
Fig. 3.
INVENTOR.
Mary L. Stinson,
BY Parker & Carter
Attorneys.

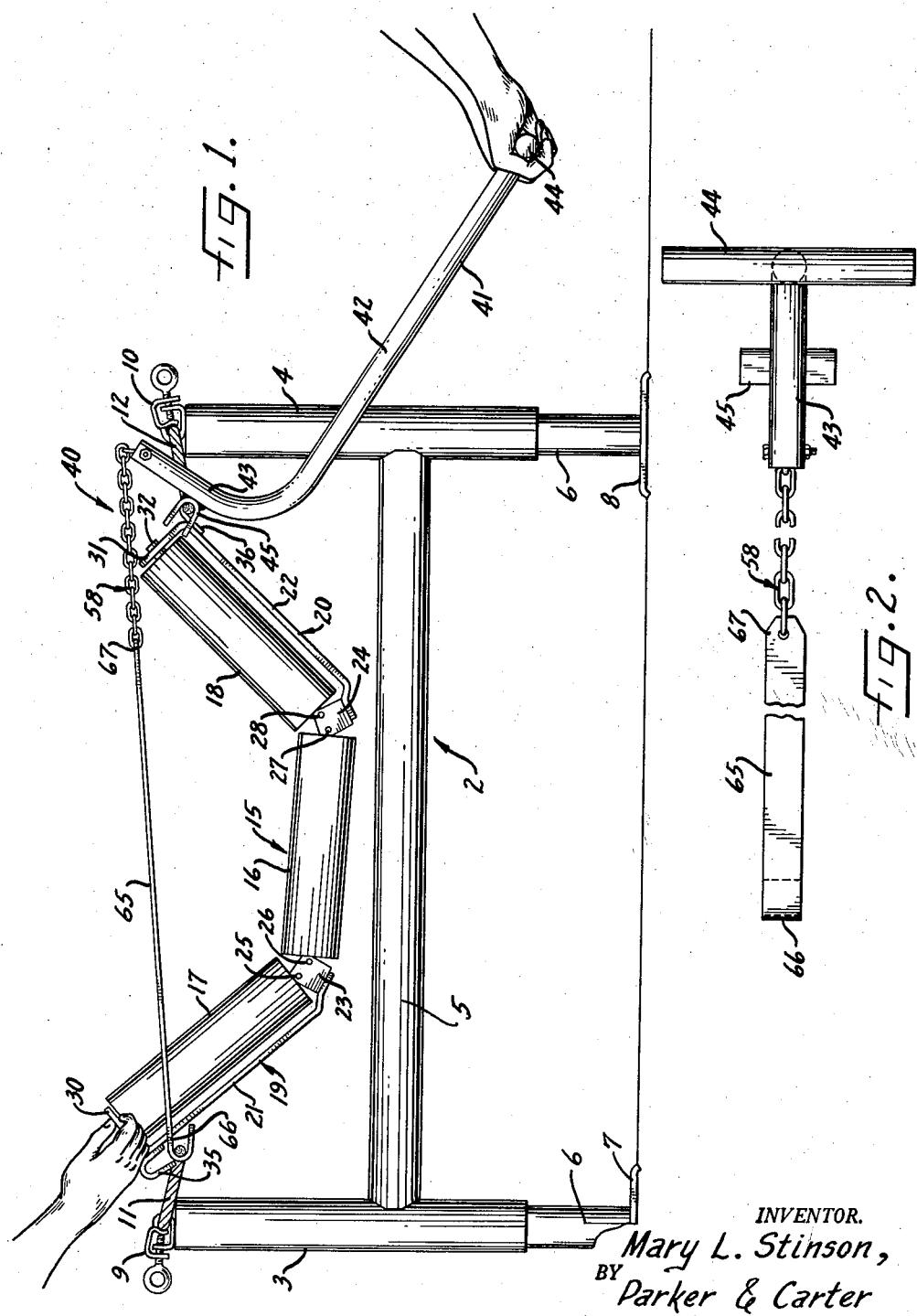

United States Patent Office 3,101,192
Patented Aug. 20, 1963

3,101,192
TOOL FOR INSTALLING TROUGHING ROLLER ASSEMBLIES
Mary L. Stinson, Chicago, Ill., assignor to Goodman Manufacturing Company, Chicago, Ill., a corporation of Illinois
Filed June 24, 1960, Ser. No. 38,522
6 Claims. (Cl. 254—77)

This invention relates in general to rope sideframe conveyors and more particularly to means for facilitating the installation and remove of idler assemblies from the rope sideframes.

Flexible strand conveyors of the type illustrated in the Craggs et al. Patent No. 2,773,257 have come into widespread use in recent years due to their many inherent desirable features. Among these features are high carrying capacity, low cost, and ease of installation and maintenance.

This type of conveyor generally comprises a pair of flexible rope sideframes such as wire ropes which are strung along a conveying course such as a mine run or the like. The strands are supported at suitable intervals by support structures such as the telescoping support stands shown in the Craggs et al. patent, or by roof bolts or other overhead supporting means. A plurality of conveying idler assemblies are suspended from the stands at generally equal increments therealong to form a bed for the conveying reach of the flexible belt. Return roller assemblies, which may be suspended from the flexible rope sideframes or by independent supporting structure such as the flexible rope sideframe stand supports, are likewise located at intervals along the conveyor to furnish support for the return reach of the belt. Usually the return roller assemblies are spaced at considerably greater distances than the conveying idler assemblies since they support no load other than the weight of the belt itself.

To set up a rope sideframe conveyor of the type illustrated in the Craggs et al. patent, the rope sideframes are first anchored at the tail and then placed under tension before the sausage idler assemblies are installed. To set up a conveyor utilizing the semi-cradled type idler assembly as illustrated in the McCann Patent 2,868,355, the ropes may or may not be fully tensioned before the idler assemblies are installed. Even if the ropes are not at full tension, however, some inward drawing force must be applied to the strands to facilitate dropping the idler assemblies in place.

Occassionally an idler assembly must be removed and another installed after the conveyor is set up and a belt is in place. In this instance, the ropes are always under full tension.

In the conventional sausage idler assembly, rope clamps are pivotally secured directly to the ends of the wing rollers and the idler assembly can be drawn fairly easily into extended relationship such that it spans the distance between the opposed ropes, whereupon the clamps can be secured to the ropes.

In some cases, however, particularly where a low clearance installation is involved and a semi-cradled troughing idler assembly is employed, the installation or removal of the assembly from between the ropes becomes a considerably more difficult operation. This is true because the assembly is constructed to provide a minimum of flex during operation and, consequently, can not be extended to any great extent lengthwise from a flexed to an unflexed relationship. In addition the rope hooks in this type of assembly are situated so as to draw the longitudinally extending ropes inwardly to a point substantially below the ends of the dead shafts of the wing rollers. This further shortens the overall assembly.

Installation difficulties might also arise in the case of the conventional idler assembly, not designed for low rope or low clearance installations, when the installation or removal of an idler assembly must be made with the conveyor belt in place. Here, it will be apparent that the idler assembly cannot be inserted under the belt and then easily extended to its unflexed full length to easily hook the rope clamps or rope saddles over the corresponding wire ropes.

Accordingly, it is a primary object of this invention to provide means for facilitating the installation and removal of troughing idler assemblies between the side ropes of a rope sideframe conveyor.

Another object is to provide a simple tool for facilitating the installation and removal of troughing idler assemblies from between the side ropes of a rope sideframe conveyor.

Yet another object is to provide a simple tool for drawing the side ropes of a rope sideframe conveyor toward one another to facilitate the installation and removal of troughing idler assemblies.

Another object is to provide a tool which may easily be adjusted to span conveyors of varying width and facilitate the installation and removal of idler assemblies of varying dimensions.

Still another object is to provide a tool of the aforedescribed character which is rugged in construction yet simple and inexpensive to fabricate.

Another object is to provide a tool of the aforedescribed character which permits such an installation or removal operation to be accomplished by a crew of only one or two men in a very short time.

These and other objects of this invention will be found in the following specification and claims wherein like reference numerals identify like parts throughout.

The invention is illustrated more or less diagrammatically in the drawings wherein:

FIGURE 1 is a front elevation taken transversely through a conventional rope sideframe conveyor adapted for low rope operation showing a support standard, a pair of rope sideframes and a semi-cradled idler assembly about to be slipped in place utilizing the tool of this invention, FIGURE 2 is a top plan view of the tool shown in FIGURE 1, FIGURE 3 is an enlarged view in half section with portions broken away illustrating means for adjusting the working length of the tool to conform to different width conveyors, and FIGURE 4 is a view taken along lines 4—4 of FIGURE 3.

A support standard for a rope sideframe conveyor constructed and arranged for low rope operation is shown generally at 2 in FIGURE 1. Such a support standard normally includes an H-frame having a pair of upstanding legs 3 and 4 rigidly connected by a transversely extending pipe 5 secured to each leg. Slidable within each of the legs 3 and 4 and extending downwardly therefrom are adjustable leg extensions 6 having ground engaging plates 7 and 8. The extensions 6 may be adjustably secured within the legs 3 and 4 by any conventional means. Rope engaging clamps 9 and 10 are secured on top of the vertically extending legs 3 and 4, and engage the longitudinally extending wire ropes 11 and 12 of the rope sideframe conveyor in snugly seated relationship.

A semi-cradled idler assembly designed for use in low rope conveyor installations is illustrated generally at 15. The assembly includes a center load carrying roller 16 flanked by a pair of slide or wing rollers 17 and 18. The inner ends of the wing rollers are connected to the center roller by cradle frame assemblies 19 and 20. In this instance, the frame assemblies include elongated generally rigid members 21 and 22 extending substantially the length of the wing rollers. Pairs of upstanding plates 23 and 24 receive pivot pins 25, 26 and 27, 28 which secure the inner ends of the wing roller dead shafts and the outer ends of the center roller dead shaft to the plates. At the opposite ends of the members 21 and 22, upwardly extending end sections 30 and 31 carry the outer ends of the wing roller dead shafts, as indicated at 32. Rope engaging hooks 35 and 36 are secured to the frame members 21 and 22 adjacent their outer ends by welding or the like.

A combination installation and removal tool is indicated generally at 40 in FIGURE 1. It includes an L-shaped hollow pipe 41 having a major leg 42 and a minor leg 43. A handle 44 is secured to the free end of major leg 42 and extends transversely thereof. The handle might be formed of a short section of pipe.

As best seen in FIGURES 2 and 3, a rope engaging structure in the form of a saddle 45 of substantial length is secured, in this instance by welding, to the minor leg 43 of the L-shaped pipe 42 and extends transversely thereof. The saddle must be of a substantial length for reasons which will be hereinafter developed.

Extending through the free end of the minor leg 43, as is seen in detail in FIGURE 4, is a bolt 50, having a head 51 and a threaded end 52 upon which a nut 53 is removably threaded. The bolt 50 extends through apertures 54 and 55 on opposite sides of the leg 43.

A conventional link chain 58 comprised of a series of links 59 extends into the free end of the hollow leg 43 and is adjustably secured therein at any point along the chain by bolt 50 extending through a predetermined particular link 59, as at 60, for example, in FIGURE 3. A rope engaging connecting strip 65 having a U-shaped hook 66 at one end thereof is secured as at 67 to the end of the chain 58 opposite that end which is inserted inside the leg 43. The strip 65 may be of spring steel of any other suitable material of sufficient strength to resist deformation under tensile loads.

The use, operation and function of this invention are as follows:

FIGURE 1 illustrates, alternatively, either the installation or removal of a semi-cradled idler assembly. In the particular assembly illustrated, the rope clamps are spaced inwardly relative to the ends of the assembly. This requires drawing the strands inwardly toward one another considerably further than if the clamps were located outwardly of the ends of the wing roller shafts.

Whether installing or removing an assembly, the tool 40 would be set up to establish the proper free length for the combined chain 58 and connecting strip 65. It will be seen that this length can easily be calculated to bring the ropes into the relative position shown in FIGURE 1 with the handle in the position shown in FIGURE 1. The proper free length setting is maintained by inserting bolt 50 through a particular chain link 59 in the chain 58, as is shown in FIGURE 3.

The laterally extending saddle 45 on the minor leg 43 is then seated on wire rope 12 with the major leg 42, carrying the handle 44, raised above the horizontal from the attitude shown in FIGURE 1. In this attitude the hook 66 on the end of the connecting strip 65 can be hooked over the opposed wire rope 11.

At this time, if an installation operation is being performed, one end of an idler assembly can be seated on a corresponding wire rope by hooking the hook 36, for example, over the wire rope 12. By forcing handle 44 downwardly then, a large leverage is obtained and as the L-shaped pipe 41 pivots about its connection at saddle 45 with wire rope 12, it draws the ropes 11 and 12 together to the position shown in FIGURE 1, whereupon the hook 35, affixed to wing roller supporting framework 19, can be hooked over the wire rope 11. The saddle 45, being of considerable length and, consequently, extending a substantial distance on either side of pipe 41, prevents the tube from pivoting sideways about its seat on rope 12.

When the handle 44 is subsequently raised the wire ropes 11 and 12 separate to firmly seat the troughing assembly therebetween.

In the event an idler assembly must be removed, the tool would be operated in much the same manner. The assembly would easily be lifted out of hooked engagement with one of the ropes and then the other rope by a workman after the ropes have been drawn together in the aforedescribed manner.

This installation or removal of a troughing idler assembly from between the ropes of a rope sideframe conveyor can be accomplished equally as well with a conveyor belt in carrying position on the idler assemblies. In such case, the chain 58 and connecting strip 65 would extend over the carrying reach of the conveyor belt to engage the opposite wire rope 11. It might be necessary in such instances to move the conveyor belt slightly upwardly to allow the one end of a wing roller to be drawn underneath it and over a corresponding wire rope, but this presents little difficulty since the edge of the conveyor belt moves under these circumstances without applying any considerable force.

It will be understood that any conveyor equipment which might be suspended between the opposed wire ropes of a rope sideframe conveyor can be installed or removed in the aforedescribed manner, and this invention is not limited to the installation and removal of troughing idler assemblies or, for that matter, troughing idler assemblies specifically adapted for low rope installations.

What has been described is a simple, effective and inexpensive tool for facilitating more efficient conveyor maintenance and operation. A crew of one or at the most two men is required to rapidly install or remove idler assemblies or other similarly suspended equipment. The tool can be fabricated without the use of specially formed parts and tube 41 could be any length of pipe which has been bent to fit the specification.

Though one form of this invention has been shown, it will be apparent that many variations could be had thereon without departing from the spirit of the invention. Consequently, it is intended that the aforementioned description be considered illustrative only and not definitive and that the scope of the invention be limited only by the appended claims.

I claim:

1. A tool for drawing the ropes of a rope sideframe conveyor toward one another to facilitate installing and removing equipment therebetween comprising an L-shaped pipe including a major and a minor leg, handle means mounted on the free end of said major leg and extending transversely thereof, a rope engaging saddle secured to said pipe adjacent the juncture of said major and minor legs, a connecting element including flexible means adapted to be inserted into the free end of said minor leg and adjustably secured thereto, said connecting element including a rope engaging hook means, said rope engaging saddle and hook means being adapted to seat against opposed ropes and draw them toward one another as said pipe pivots about the rope engaged by said saddle responsive to vetical movement of said handle means transversely of the plane of the ropes.

2. The tool of claim 1 further characterized in that said rope engaging saddle includes a saddle of substantial length extending transversely of said pipe.

3. The tool of claim 1 further characterized by and including removable means extending through said minor leg and adapted to releasably engage said flexible means.

4. A tool for drawing the ropes of a rope sideframe conveyor toward one another to facilitate installing and removing a troughing idler assembly therebetween comprising a hollow L-shaped pipe including a major and a minor leg, a cross bar handle secured to the free end of said major leg and extending transversely thereof, a rope engaging saddle secured to said minor leg adjacent the juncture of said major and minor legs, said saddle including portions extending a substantial distance on opposite sides of said pipe, a connecting element including a chain insertable inside the free end of said minor leg and adjustably secured therein by pin means extending through said minor leg transversely thereof, said connecting element including a rope engaging hook means, said rope engaging saddle and hook means being adapted to seat against opposed ropes and draw said ropes toward one another as said pipe pivots about the rope engaged by said saddle responsive to vertical movement of said handle means.

5. The tool of claim 4 further characterized in that said connecting element includes a strip extending longitudinally of said pipe and adapted to extend laterally of said ropes, said strip being connected to said chain at one end, said hook being formed at the other end of said strip.

6. A tool for drawing the ropes of a rope sideframe conveyor toward one another to facilitate installation and removal of equipment therebetween, said tool comprising a rigid lever member having minor and major legs joined at an angle to one another, a flexible connecting element swingable about the free end of the minor leg, and when the tool is in use, extending outwardly therefrom in a direction opposite to the direction in which said major leg extends from said junction of the two legs, rope engaging structure secured to the minor leg, said rope engaging structure being located a substantial distance inwardly from the free end of the minor leg and facing outwardly of said minor leg in a direction opposite to that in which said major leg extends, said rope engaging structure, when in engagement with a rope sideframe, providing a pivot of rotation for the lever member which enables the lever member to rest upon, and pivot about, a first rope sideframe in a plane transverse of and generally perpendicular thereto, the inner end of said connecting element being secured to the minor leg and the outer end terminating in structure engageable with a second rope sideframe, whereby, upon application of a turning force to the free end of the major leg to put tension on said flexible member, the rope sideframes are drawn toward one another.

References Cited in the file of this patent

UNITED STATES PATENTS

| 759,974 | Durail | May 17, 1904 |
| 1,391,822 | Evans | Sept. 27, 1921 |
| 1,456,143 | Ness | May 22, 1923 |
| 1,758,831 | Haubert | May 13, 1930 |
| 2,486,883 | Ruffin | Nov. 1, 1949 |

FOREIGN PATENTS

| 590,057 | Great Britain | July 7, 1947 |